United States Patent [19]

Stocker

[11] Patent Number: 4,669,330
[45] Date of Patent: Jun. 2, 1987

[54] CABLE LENGTH ADJUSTER

[75] Inventor: Raymond Stocker, West Bloomfield, Mich.

[73] Assignee: Ford Motor Company, Dearborn, Mich.

[21] Appl. No.: 922,805

[22] Filed: Oct. 27, 1986

Related U.S. Application Data

[63] Continuation of Ser. No. 655,781, Oct. 1, 1984, abandoned.

[51] Int. Cl.$^4$ ............................................. F16C 1/10
[52] U.S. Cl. .......................... 74/501.5 R; 74/501 R; 192/111 R; 192/111 T; 248/56
[58] Field of Search ........ 74/501.5 R, 501 R, 501 D, 74/501 F, 502; 411/349, 549, 552, 553; 24/593, 594, 595; 403/374, 110, 348, 71; 40248/27.1, 27.3, 56; 192/111 A, 111 B, 111 T, 111 R; 188/196 R, 196 M, 65.1, 67, 20; 285/305, 320, 162; 174/153 G, 65 G

[56] References Cited

U.S. PATENT DOCUMENTS

| | | |
|---|---|---|
| 535,772 | 3/1895 | Robinson .......................... 188/196 B |
| 773,070 | 10/1904 | Fuller .................................. 403/191 |
| 816,702 | 4/1906 | Bell ..................................... 403/104 |
| 928,370 | 7/1909 | Feickert ........................... 285/320 X |
| 1,593,994 | 7/1926 | Strid ..................................... 248/56 |
| 1,927,615 | 9/1933 | Ponti et al. ....................... 74/501 R |
| 2,244,351 | 6/1941 | Venables ......................... 403/344 X |
| 2,261,537 | 11/1941 | Zamarra ......................... 411/437 X |
| 2,494,814 | 1/1950 | Huth ................................ 248/56 X |
| 2,780,324 | 2/1957 | Boyle ............................... 188/196 B |
| 2,912,878 | 11/1959 | Brickman ........................ 74/501 X |
| 3,206,249 | 9/1965 | Gateley ............................... 297/416 |
| 3,407,454 | 10/1968 | Myatt ................................... 411/549 |
| 3,572,159 | 3/1971 | Tschanz ............................ 74/501 R |
| 3,587,341 | 6/1971 | Fiddler .............................. 74/501 R |
| 3,662,617 | 5/1972 | Bennett et al. .................... 74/501 R |
| 3,710,645 | 1/1973 | Bennett ............................. 74/501 R |
| 3,768,612 | 10/1973 | Gale ................................. 192/111 A |
| 3,789,967 | 2/1974 | Dau et al. ........................ 192/111 A |
| 3,926,294 | 12/1975 | Bastian .......................... 403/374 X |
| 4,177,691 | 12/1979 | Fillmore ........................... 74/501 P |
| 4,185,936 | 1/1980 | Takahashi .......................... 403/104 |
| 4,190,222 | 2/1980 | Appleton et al. ............... 285/162 X |
| 4,474,489 | 10/1984 | Simon ............................. 403/194 X |

FOREIGN PATENT DOCUMENTS 2278982  2/1976  France .............................. 74/501.5

Primary Examiner—Gary L. Smith
Assistant Examiner—Rodney M. Lindsey
Attorney, Agent, or Firm—Frank G. McKenzie; Donald J. Harrington

[57] ABSTRACT

A cable length adjusting device includes a housing fixed in position against longitudinal displacement and formed with a surface having multiple teeth, an adjuster fitted within the hole of the housing and formed with teeth along its length that can engage the teeth of the housing, a compression spring that biases the adjuster away from the housing, a retainer that limits the amount of longitudinal movement of the adjuster relative to the housing due to the effect of the spring, a locking mechanism that pivots the adjuster on the surfaces of the housing hole so that the teeth of the adjuster and housing are brought into engagement, a conduit fixed to the adjuster and a cable core supported within the conduit and adapted for attachment at each of its ends to a pivotally mounted lever.

12 Claims, 13 Drawing Figures

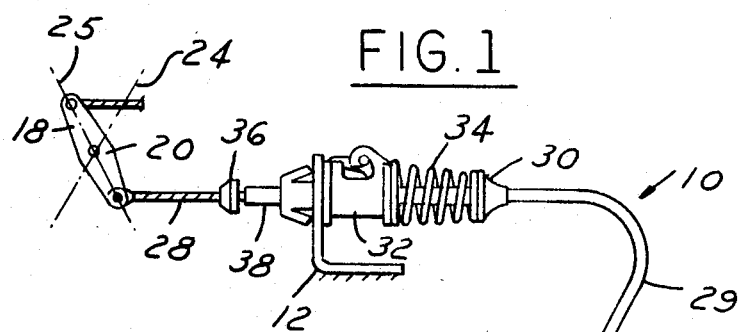
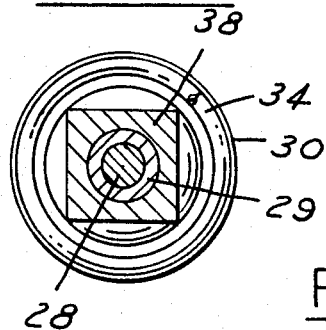
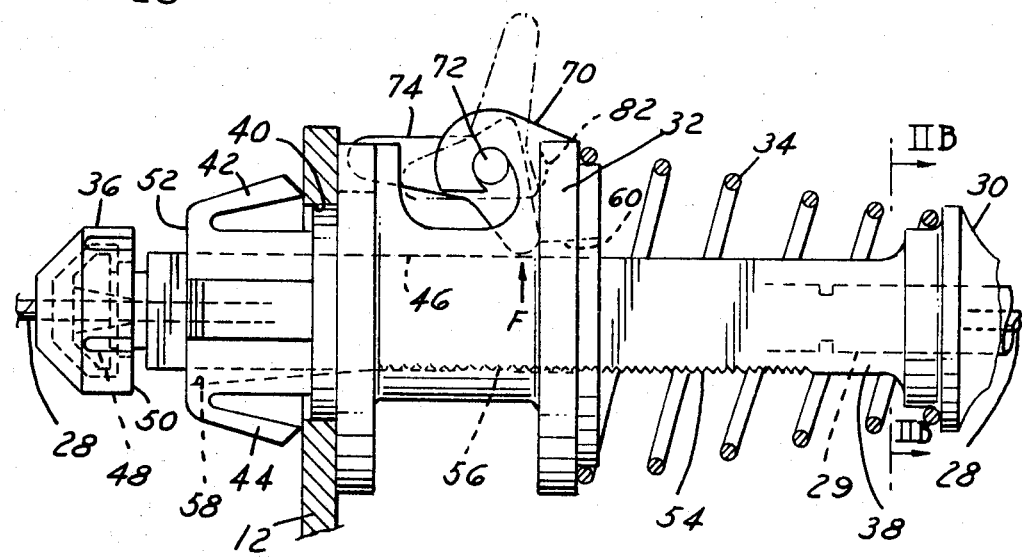

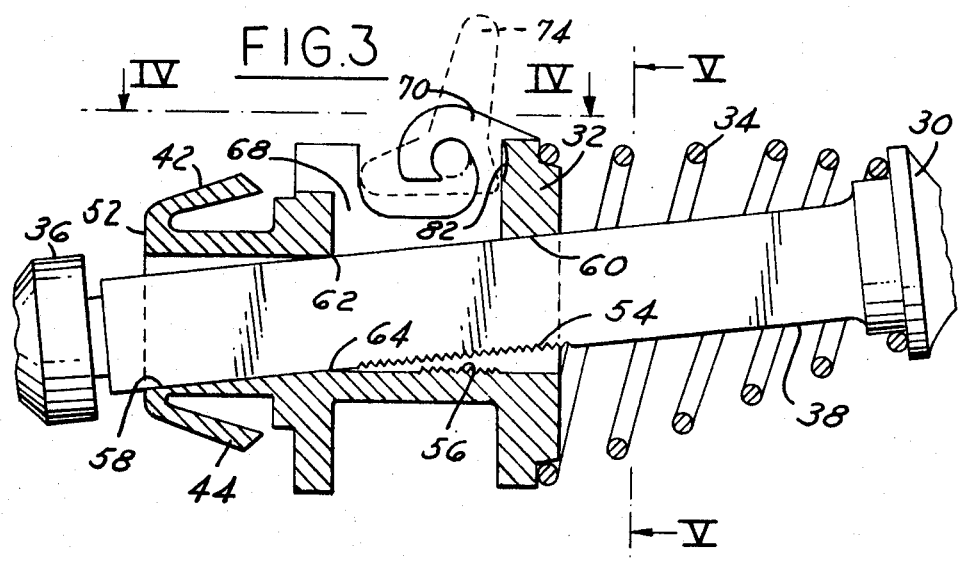
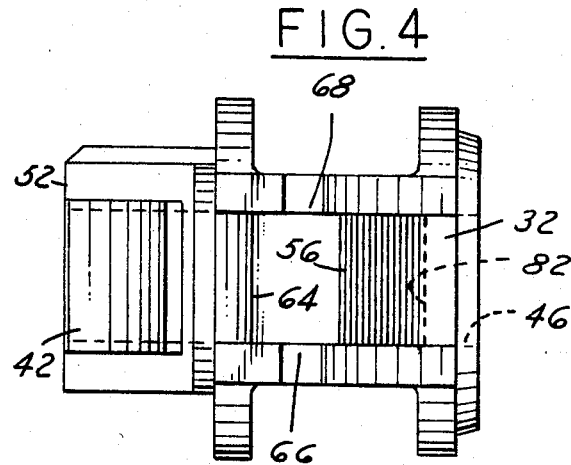
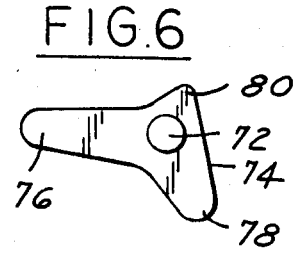
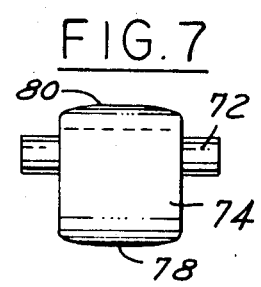
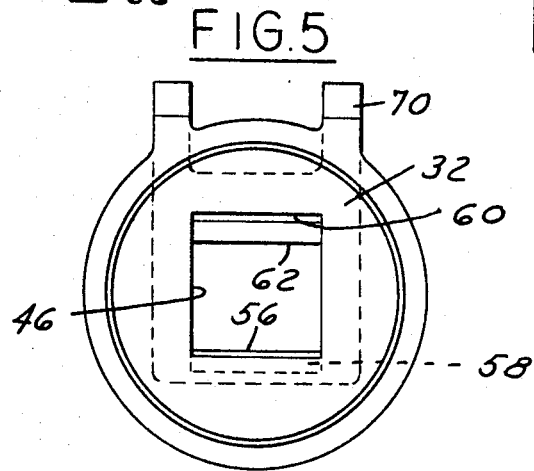

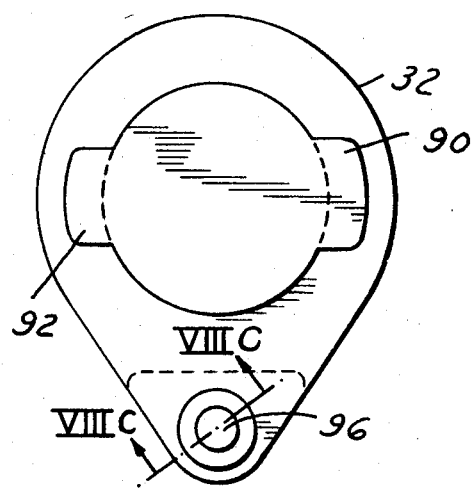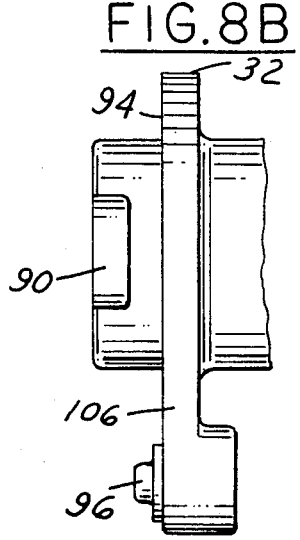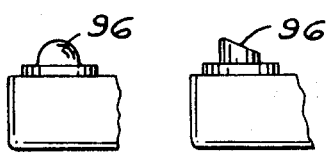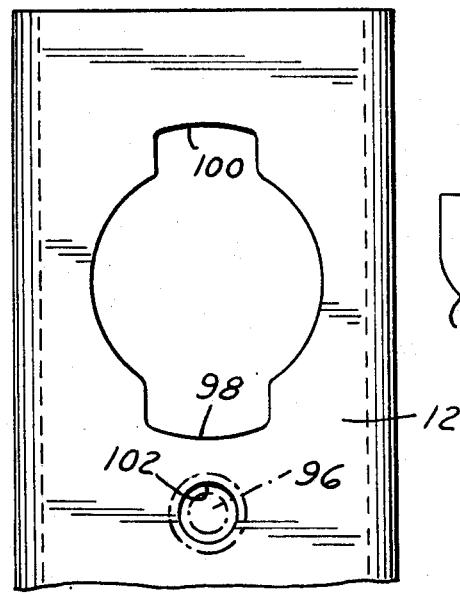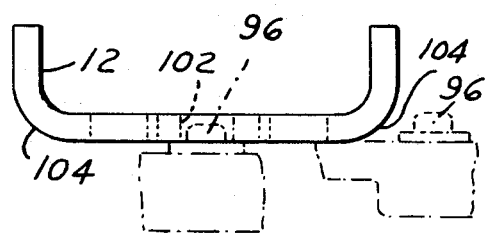

CABLE LENGTH ADJUSTER

This application is a continuation of application Ser. No. 655,781, filed Oct. 1, 1984, now abandoned.

BACKGROUND OF THE INVENTION

1. Field of the Invention.

This invention relates to a device for transmitting motion by cable tension along a curved path within a flexible conduit. More particularly, this invention pertains to a device for automatically adjusting the length of a cable assembly.

2. Description of the Prior Art.

Cable assemblies that transmit motion from one moveable component to another generally include means adjacent each end of a conduit for attaching the conduit to a support structure, and a core element, usually a cable, extending from each end of the conduit. Frequently, however, the end of the cable does not extend from the conduit the proper amount for attachment. It is necessary then to adjust the effective length of the cable assembly that extends between the support structure and the component attachment by changing, after the assembly is installed, the position of the conduit with respect to the position of the support. The length of the cable that extends from the end of the conduit may be changed by altering the length of the path over which the conduit extends. Usually this path has curves or bends whose lengths are reduced by increasing the length of the conduit that extends beyond the mounting points of the assembly.

However, once the assembly is adjusted, it is usually difficult to release the locking member from engagement with ratchet teeth on a fitting that is secured to the conduit in order to reposition or readjust the assembly for repair and maintenance. U.S. Pat. No. 3,572,159 describes a motion transmitting remote control assembly of this type.

Another disadvantage of the previous assemblies is that the amount of force with which the ratchet teeth are urged together is not easily controlled, and it is difficult to vary the force among identical configurations having different requirements.

SUMMARY OF THE INVENTION

The cable length adjusting device according to the present invention includes at least one support bracket for mounting the housing of the assembly to a fixed structure against longitudinal movement and a slideable adjuster member moveable within the housing adapted to selectively engage and disengage the housing so that the adjuster is fixed against longitudinal movement when engaged and free to move longitudinally with respect to the housing when disengaged. The adjuster is formed with grooves or teeth on its outer surface and the surface of the hole in which the adjuster is fitted is similarly formed with grooves or teeth that are engageable with the teeth of the adjuster. The housing hole has sloping ramp surfaces that permit the adjuster to pivot within the housing with respect to the longitudinal axis of the housing and to pivot into alignment with the axis of the housing.

A locking mechanism mounted on the housing includes a locking member, which is pivotally mounted on the housing so that a locking arm can be rotated into engagement with the surface of the adjuster in order to pivot the adjuster on the surfaces of the housing hole into alignment with the axis of the housing, thereby causing the teeth to become engaged. Similarly, when the locking mechanism is moved to an unlocked position, the adjuster pivots on the surfaces of the housing out of alignment with the axis of the housing, thereby disengaging the teeth of the adjuster from those of the housing and permitting the adjuster to move longitudinally with respect to the housing.

Tensile load applied to the cable while adjusting the position of the levers causes the adjuster to move longitudinally within the housing to its correct position with respect to the mounting bracket. When the correct cable assembly length is determined during adjustment, the locking mechanism is rotated to the locked position, causing the adjuster and the housing to be engaged thus fixing their positions relative to one another.

BRIEF DESCRIPTION OF THE DRAWINGS

FIG. 1 shows a throttle valve cable assembly mounted in a vehicle and connecting the throttle linkage of a carburetor and the throttle valve lever of an automatic transmission.

Figure 2A is a side elevational view of the throttle valve assembly adjustment mechanism according to this invention, and FIG. 2B cross section taken at plane IIB—IIB of FIG. 2A.

FIG. 3 is a cross section through the axis of the adjustment mechanism in the unlocked position showing the teeth of the housing and those of the adjuster disengaged.

FIG. 4 is a top view of the housing taken at plane IV—IV.

FIG. 5 is an end view of the housing taken at plane V—V.

FIGS. 6 and 7 are side and end views of the locking member.

FIGS. 8A and 8B are front and side views of an alternate form for attaching the housing to the mounting bracket. FIG. 8C is a view taken at plane VIIIC—VIIIC showing alternate forms of a locating pin fixed to the housing.

FIGS. 9A and 9B are front and top views of the mounting bracket for use with the configuration of the housing shown in FIGS. 8A, 8B and 8C.

DESCRIPTION OF THE PREFERRED EMBODIMENT

Referring first to FIG. 1, the throttle valve cable assembly 10 is supported on mounting brackets 12, 14 and is connected at one end to the throttle valve mechanism 16 of an automatic transmission and at the opposite end to an engine throttle linkage 18, whose position about its pivot 20 is determined by the position of the accelerator pedal of the vehicle. Levers 16 and 18, shown at their idle positions 25, 27, rotate about pivots 20 and 22 to their wide open throttle positions 24, 26.

The cable assembly 10 includes a conduit 29, within which the cable 28, which is attached to levers 16 and 18, is free to move along a path that includes the slack or curved path portion located between mounting brackets 12 and 14. As throttle lever 18 rotates according to changes in the position of the accelerator pedal its motion is transmitted by cable 28 to the throttle valve mechanism of the automatic transmission, of which lever 16 is a part.

Referring now to FIG. 2A, the cable length adjusting device according to this invention further includes a flange 30 fixed on the outer surface of conduit 29, a housing 32 longitudinally spaced from flange 30, and a compression spring 34 located between flange 30 and an end face of housing 32. A retainer 36 fixed to the end of an adjuster 38 prevents the adjuster from moving, under certain conditions, due to the force of spring 34 relative to the housing.

Flange 30, which is fixed to the outer surface of conduit 29, provides a flat transverse surface against which the end coils of spring 34 bear, and housing 32 defines a planar surface against which the coils at the opposite end of spring 34 bear. A first configuration of the mounting bracket 12 includes a hole 40 through which resilient tangs 42 and 44, formed integrally with housing 32, can pass and expand radially outward into contact with the surface of the mounting bracket. Adjuster 38, which is fixed to conduit 29, passes through a passage 46 in the housing 32 and is formed with a headed end 48 fitted within the interior of retainer 36. The retainer has a longer lateral dimension than adjuster 38 and is formed with a surface 50 that is forced into contact with the face 52 of the housing due to the effect of spring 34. The retainer has several angularly spaced axial slots that allow the plane on which surface 50 is formed to envelope the headed end 48 and to close the plane.

FIG. 2B shows that adjuster 38 has a rectangular cross section and FIG. 2A shows that it also has multiple serrations or teeth 54 formed on its lower planar surface, which can be brought into meshing engagement with teeth 56 formed on the lower planar surface of housing 32. The housing has ramp surfaces 58, 60 against which the lower and upper surfaces of adjuster 38 are brought into contact when the adjuster is pivoted to the position shown in FIG. 3. This pivoting brings teeth 54 and 56 out of engagement and permits longitudinal movement of the adjuster, conduit and cable relative to the housing. Points 62 and 64 are the side projections of the line contact between the upper and lower surfaces of adjuster 38 and the rectangular hole 46, which extends through housing 32 and in which adjuster 38 pivots.

The housing is formed with parallel, longitudinally directed flanges 66, 68 which define hooked arm portions 70. A transversely directed stub shaft 72 fits within the circular recess formed in each arm 70 and provides a rotatable mounting for a locking member 74, which can be rotated into engagement with the upper surface of adjuster 38. Member 74 has three arms extending radially outward from the axis of shaft 72. The first arm 76 is used for manually gripping the lock and rotating it, the second arm 78 is brought into engagement with the upper surface of adjuster 38 as the lock is rotated, and the third arm 80 holds arm 76 in the generally vertical position shown in FIG. 3 by its interference at 82 with a vertical wall of the housing.

The throttle valve cable assembly is installed in the vehicle with the locking mechanism in the unlocked position shown in FIG. 3 by inserting tangs 42 and 44 through holes in the mounting bracket 12 adapted to receive them and allowing the tangs to spring radially outward into contact with the surface of the mounting bracket. A similar attachment is made at mounting bracket 14. Initially, before the length of the cable assembly is adjusted, adjuster 38 and the adjacent face of retainer 36 are brought into contact by the force of spring 34. One end of cable 28 is connected to lever 16 and the opposite end is connected to lever 18. Actuation arm 76 of the locking mechanism 74 is in the unlocked, generally vertical position shown in FIG. 3, and adjuster 38 is inclined within the housing on ramp surfaces 58 and 60, thereby permitting teeth 54 and 56 to disengage.

The transmission lever 16 is held at its idle position 27 by a device (not shown) that prevents lever 16 from rotating due to the force of spring 34. This holding device is removed after the cable length is adjusted. Next, the engine throttle lever 18 is moved against its idle stop at position 25 and then actuation arm 76 is rotated counterclockwise to the position shown in FIG. 2A. This rotation disengages arm 80 of the locking mechanism from contact on the housing and brings locking arm 78 into contact with the adjuster forcing it to the locked position where teeth 56 and 54 engage.

Retainer 36 acts as a stop to prevent disassembly of adjuster 38 from housing 32, and the hole provided in the retainer through which the cable core extends acts as a wiping surface for the cable as it moves within the housing.

The pivoting motion of adjuster 38 at 62 and 64 assures that locking arm 78 of the locking mechanism contacts the upper surface of the adjuster in the locked position. At the line of contact between the adjuster and locking arm 78, an upwardly directed force F, shown in FIG. 2A, is developed and is directed eccentrically of the axis of stub shaft 72. This eccentricity additionally assures that locking member 74 is biased in the counterclockwise or locking direction until an additional force, applied by an operator, causes locking member 74 to rotate clockwise to the unlocked position.

The portion of the housing 32 that includes the resilient tangs 42 and 44 can be replaced with the configuration shown in FIGS. 8A, 8B and 8C when it is used in combination with the mounting bracket shown in FIGS. 9A and 9B. Formed on the end of the housing are two diametrically opposite retaining flanges 90, 92, which are spaced longitudinally from the adjacent face 94 of housing 32. Preferably one of the flanges, flange 90 in the example shown in FIG. A, has a greater width than the other flange 92. Mounting bracket 12 is formed with a contoured hole sized to receive flanges 90 and 92 within the slots 98 and 100, respectively.

Extending longitudinally from face 94 is a locking pin 96, a cylindrical pin having a flat end such as that shown in FIGS. 8B and 9B. Alternatively, pin 96 may have a spherical end or an inclined end face such as is shown in FIG. 8C. The locking pin is sized to fit within hole 102 located in the mounting bracket below slot 98.

From FIG. 9B it can be seen that the mounting bracket is in the form of a channel having corner bend radii 104. On assembly, the flanges are inserted within the slots of the mounting bracket, pin 96 is located beyond the corner bend of the mounting bracket at the position shown in FIG. 9B. The housing is retained on the mounting bracket by rotating the housing 90 degrees, thereby bringing the flanges out of alignment with the slots. This rotation causes an interference between pin 96 and the web of mounting bracket 12. However, the spherical end of pin 96 and the inclined end face of pin 96 provide lead surfaces which cooperate with the radius of the corner bend so that pin 96 can be brought readily into alignment with hole 102 by causing bending through the thickness of the flange 106 until the pin aligns with hole 102. This locates the housing into the bracket and prevents longitudinal displacement and rotation.

Having described the preferred embodiments of my invention, what I claim and desire to secure by U.S. Letters Patent is:

1. A cable length adjusting device comprising:
    a housing mounted against longitudinal movement, defining a longitudinally directed passage therein having engageable means in the passage for preventing longitudinal movement when engaged, and longitudinally spaced inclined surfaces formed in the passage located at opposite longitudinal sides of the engageable means;
    an adjuster fitted within the passage of the housing having means adapted to engage the engageable means, the adjuster being supported piviotably on the inclined surfaces when disengaged from the engageable means;
    locking means for piviotying the adjuster away from the inclined surfaces by the application of a force directed transverse to the direction of movement of the adapter through the passage, and for locking the adjuster in engagement with the engageable means; and
    spring means for resilientlly urging the adjuster to move longitudinally through the passage.

2. The device of claim 1 further comprising a mounting bracket having a surface on which the housing is mounted, defining in said surface a first hole, angularly spaced recesses extending from said hole and a second hole adjacent the first hole, and wherein said housing includes mounting flanges spaced angularly from one another, a surface offset longitudinally from the mounting flanges, and a pin extending toward the mounting flanges, angularly spaced from the mounting flanges and located to fit within the second hole after the mounting flanges are fitted within the mounting bracket recesses and rotated out of alignment with the recesses.

3. The device of claim 2 wherein the mounting bracket surface interferes with the pin and the pin is mounted on the housing for resilient movement longitudinally with respect to the mounting bracket surface, whereby said interference is removed by moving the pin with respect to the mounting bracket while rotating the mounting flange out of alignment with the recesses.

4. The device of claim 3 wherein the pin has a surface inclined with respect to the surface of the mounting bracket.

5. The device of claim 3 wherein the pin has a spherical surface at its end that is adjacent the surface of the mounting bracket.

6. The device of claim 1 wherein the engageable means comprise teeth directed radially inward and the inclined surfaces permit the adjuster to pivot toward and away from the teeth, and wherein the adjuster has teeth adapted to engage the teeth on the housing.

7. The device of claim 1 wherein the engageable means comprise teeth directed radially inward, the housing includes longitudinal surfaces on which the adjuster moves, and the inclined surfaces intersecting the longitudinal surfaces to define a piviot located at the intersection of the longitudinal and inclined surfaces on which pivot the adjuster moves into and out of engagement with the teeth of the housing.

8. The device of claim 7 wherein the teeth of the housing are formed on a longitudinal surface of the housing passage.

9. The device of claim 1 wherein the locking means includes a shaft rotatably mounted on the housing, a locking member fixed to the shaft having a first arm extending from the shaft, adapted to rotate into contact with the adjuster and to move the adjuster into engagement with the movement preventing means.

10. The device of claim 9 wherein the locking means further includes a second arm extending from the shaft, spaced angularly with respect to the first arm, and adapted to rotate the first arm toward and away from the adjuster.

11. The device of claim 10 wherein the locking means further includes a third arm extending from the shaft, spaced angularly with respect to the first arm and second arm, located to interfere with a surface of the housing when the first arm is out of contact with the adapter, whereby the locking member is prevented from rotating the first arm into contact with the adapter.

12. The device of claim 1 wherein the locking means includes a shaft rotatably transversely mounted on the housing, a locking member fixed to the shaft having a first arm extending from the shaft, adapted to rotate on the shaft into contact with the adjuster and to hold the adjuster in engagement with the movement preventing means, the point of contact between the first arm and the adjuster in the engagement position being longitudinally offset from the axis of the shaft.

* * * * *